United States Patent [19]
Sandefur

[11] 3,799,118
[45] Mar. 26, 1974

[54] INSECT EXTERMINATING DRUM AND HANGER THEREFOR

[76] Inventor: Herbert G. Sandefur, P.O. Box 33, Sasakwa, Okla. 74867

[22] Filed: Feb. 20, 1973

[21] Appl. No.: 333,515

[52] U.S. Cl.................................. 119/106, 239/36
[51] Int. Cl............................................ A01k 27/00
[58] Field of Search...... 119/106, 109, 156; 239/36, 239/55, 57

[56] References Cited
UNITED STATES PATENTS

| | | | |
|---|---|---|---|
| 1,963,501 | 6/1934 | Mitchell............................ | 239/57 X |
| 3,687,114 | 8/1972 | Berkstresser....................... | 119/106 |
| 1,732,028 | 10/1929 | Reiner................................. | 239/36 |

*Primary Examiner*—Russell R. Kinsey
*Assistant Examiner*—J. N. Eskovitz
*Attorney, Agent, or Firm*—Harvey B. Jacobson; Clarence A. O'Brien

[57] ABSTRACT

An insecticide containing, insect attracting and exterminating drum having a farm animal neck encircling drum suspending and dangling rope, said drum being made of self-shape retaining moldable plastic material and comprising a cup-like receiver section embodying a cylindrical wall telscoping into a cylindrical skirt-like depending rim on the coordinating cover section. These two sections are separably but retentively assembled, the receptacle portion of the receiver section having a fine mesh screen bottom and enclosing a built-in container for a wad of cotton saturated with a suitably functioning insecticide. The attracted insects (flies, wasps, mosquitoes, ticks, mites and the like) land on the exterior surface of the screen, eat, die and drop to the ground. Currents of air circulate freely and aid in the accumulating and exterminating steps. The sections snap together and promote necessary handling and replenishing steps. The top of the cover section is provided with an upstanding hanger flange having paired holes through which lower free ends of the suspending rope are adjustably threaded.

8 Claims, 4 Drawing Figures

PATENTED MAR 26 1974 3,799,118
Fig. 1
Fig. 2
Fig. 3
Fig. 4
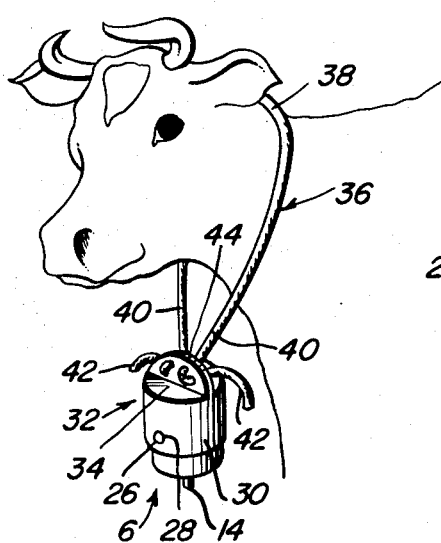
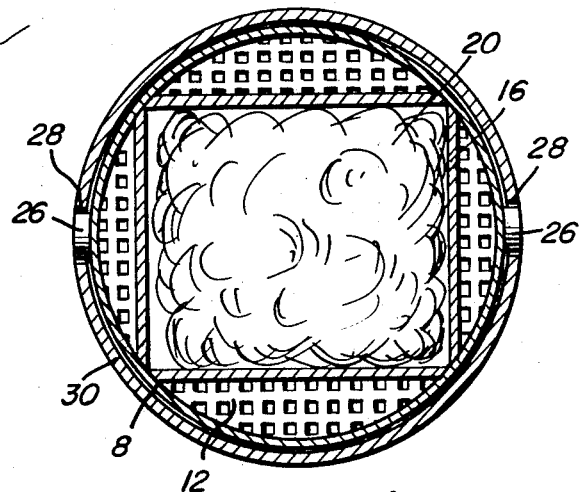
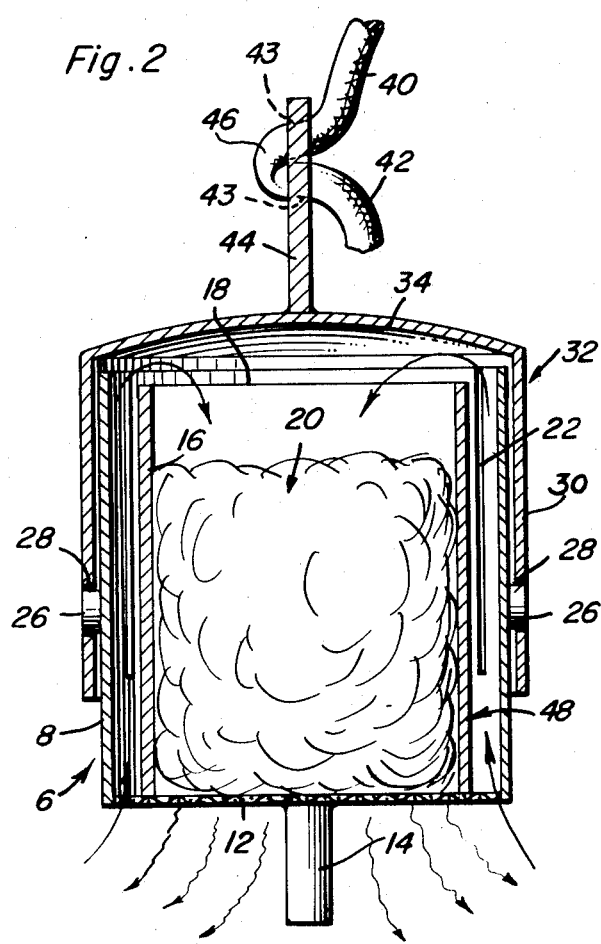
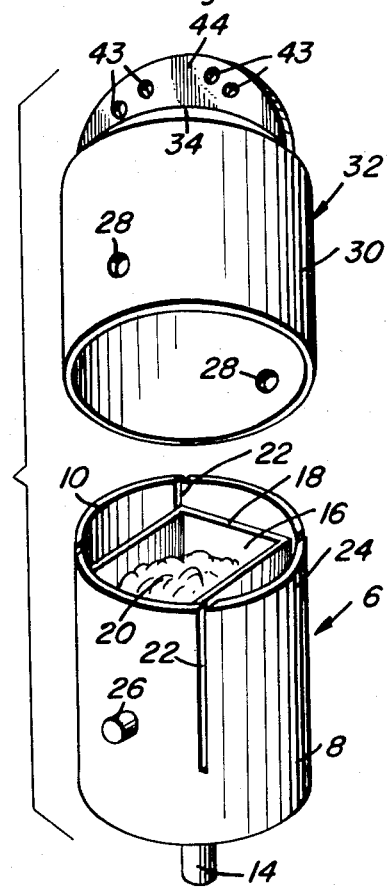

INSECT EXTERMINATING DRUM AND HANGER THEREFOR

This invention relates, generally stated, to insecticide containing and dispensing devices, broadly classified as insect traps and exterminators, and pertains, more particularly, to an innovation which is herein set forth as as insecticide containing and dispensing insect attracting and exterminating drum and suspension means therefor.

More specifically, the concept has to do with a firm plastic sectional drum comprising an open-top cup-like receiver which is telescopingly fitted and snapped within the encompassing confines of a depending skirt or rim embodied in a complemental cap-type cover. The bottom of the receiver is reticulated and provides an insect attracting screen on the exterior surface of which the insects accumulate, feed on the secticide which oozes through the screen, are poisoned, die and drop to the ground. The top section is fashioned into and provides a cover for the receptacle portion of the receiver and, when in use, is equipped with unique suspending and supporting means.

Many and varied insect poisoning and exterminating devices have been devised and used and, under the circumstances, it is common in this field of endeavor to categorize such adaptations as insect traps. One prior patent which may be helpfully informative is shown in U.S. Pat. No. 1,047,282 granted to Charles F. Penn et al. and has to do with a trap characterized by a poison containing and dispensing receptacle and a handling bail. Secondly, attention may be accorded the insect disposal device shown in a patent to Edward L. Watson, U.S. Pat. No. 1,328,936 which is cited here because it shows a lower section embodying reservoir means and a hood or top component which is capable of being suspended for use wherever necessary or desired. Then, too, reference, if desired, may be made to U.S. Pat. No. 3,303,599 covering an insect trap granted to Earcy L. Ballard. All of these prior art devices are primarily used as insect collecting difficult-to-empty traps. This aspect of the matter is mentioned at the outset for the reason that the unique drum constituting the subject matter of the invention does not house or confine insects therein and is not, strictly speaking, a trap. In fact the insects are attracted to the reticulated bottom or screen for timely extermination and drop-down disposal.

The herein disclosed exterminating drum lends itself to feasible use in attracting and successfully disposing of flies of all kinds, wasps, mosquitos, ticks, lice, mites and analogous insects. It can be reiterated that the insects are enticed and attracted to the color-coded drum, are held captive on the exterior surface of the screen and are permitted to descend to the ground in what has shown to be a highly successful and satisfactory manner.

Briefly the insect attracting and exterminating drum comprises a vertically elongated cup-like receiver characterized by an imperforate wall defining a body, said receiver being open at its top and provided with a suitably reticulated bottom. An insecticide container or reservoir is enclosed within the receptacle portion of the receiver. This container is open at upper and lower ends, the open lower end being seated atop and attached to the reticulated bottom. A companion section or unit constitutes a cover, said cover being imperforate and spanning and covering the open top and having a solid depending rim or skirt portion surrounding and telescopingly receiving and enclosing the body portion of the receiver. Practical means is carried by the cover for suspending and supporting the drum wherever seemingly necessary or desired.

To the ends desired the container or reservoir embodies an imperforate wall which is spaced from and surrounded by the wall of the body, the existing space then functioning to permit air to enter the space by way of the reticulated bottom, pass upwardly, circulate downwardly by way of the container and then discharge into the atmosphere by way of the small orifices in the reticulated bottom.

An object of the invention, generally stated, is to structurally, functionally and in other ways improve upon prior art insect exterminating devices and, in doing so, to provide a simplified construction wherein the companion sections are preferably made of polyethylene or, alternatively, polypropylene.

The overall two-part or sectional containing, dispensing and exterminating drum has means on the upper end of the cover to accommodate a flexible hanger, more particularly, a suitable length of strong nylon cord or rope bent upon itself between its ends and adapted to be looped and hung over the neck of a cow and having free lower ends separably and adjustably connectible with means provided therefor atop the cover.

These together with other objects and advantages which will become subsequently apparent reside in the details of construction and operation as more fully hereinafter described and claimed, reference being had to the accompanying drawings forming a part hereof, wherein like numerals refer to like parts throughout.

FIG. 1 is a view in perspective showing the insect exterminating drum and cord type hanger therefor, said hanger being looped over the neck of an animal, a cow for example, in a manner to dangle and movably suspend the drum for highly satisfactory use.

FIG. 2 is a view with parts in section and elevation taken centrally through the drum and showing all of the essential details of construction and how they coordinate in achieving the result desired.

FIG. 3 is a horizontal sectional view detailing the container or reservoir, the screen, and other coacting component parts.

FIG. 4 is a view in perspective showing the two sections, that is the specially constructed receiver and the associated cover means therefor.

With reference in particular to FIG. 4 it is significant to mention again that the two-part or sectional drum is preferably made from polyethylene which has been found to be properly heat resistant and moldable to provide the solid characteristics which have been found to be so necessary in a device of the type under consideration. The aforementioned vertically elongated cup-like receiver is denoted by the numeral 6 and has a solid cylindrical wall or body portion 8 which is open at the upper open end. The upper end portion is conveniently denoted at 10. The underneath or bottom side is reticulated and, more specifically, comprises a disk-like rigid screen 12 (FIG. 2) of requisite fine mesh. The central portion of the screen is provided with a rigid depending anti-licking stout integral pin-like guard 14. The aforementioned rectangular box-like bait or insecticide container is denoted by the numeral 16 and has its corner portions integral with the encompassing interior of the receiver. It will be noted that the walls of the container or reservoir are spaced from the encompassing wall portions of the receiver to achieve the air circulating result illustrated by indicating arrows in FIG. 2. The open upper end 18 is spaced below the corresponding upper end of the receiver. The container portion is provided with suitable insecticide means which may be a wad 20 of cotton or absorbent material saturated with a desired chemical commercial insect killing product. It will be further noted that circumferentially spaced slits 22 are provided and divide the wall into segmental circumferentially separated portions 24 which are sufficiently resilient and permit the diametrically opposite outstanding keepers 26 to function properly, that is, to fit into keeper holes 28 provided in diametrically opposite sides of the depending complemental skirt or rim portion 30 of the cover section 32. This cover section embodies, in addition to the imperforate rim 30 a suitably shaped and proportioned cover 34 which spans the insertable and removable receiver section 6. The receiver section is such in dimension that it can be fitted with requisite nicety within the surrounding confines of the skirt or rim 30. The use of the circumferentially spaced slits and yielding pressure responsive sectors 24 permits ready assembling and dismantling of the drum.

The hanger or suspension means which is, for the most part, used in supporting the disclosed drum may vary in construction. However and for purposes of the present disclosure the hanger means 36 comprises a nylon cord or rope of requisite length bent upon itself to form a loop, the bight portion 38 being saddled or looped over the neck of the wearer, which in FIG. 1 is a cow. The lower end portions 40 have free terminal portions 42 which are threaded through properly paired holes 43 (FIG. 4) provided therefor in the centralized lug-like flange 44, as brought out with particularity in FIG. 4. In achieving the result desired the terminal ends are threaded through the holes in a manner that each snubbed portion 46 (FIG. 2) functions to provide the desired attaching and retaining result.

Experience has shown that the disclosed sectional drum is strong, durable, light in weight and can be and preferably is color-coded. It has been discovered by trial and error experimentation that various colors attract insects such as for example, mosquitos, flies, wasps, hornets, mites and numerous other animal pestering insects. By using a prescribed insecticide, experience has shown that honeybees are neither attracted nor harmed.

It will be noted that the drum is characterized, primarily stated, by two component sections 6 and 32. The box-like container or reservoir 16 is molded inside the receptacle portion of the receiver and is such in cross section as to provide air passages such as designated at 48 in FIG. 2. The circulating air has been found to keep the "bait" cool and to control the melting and dispensing step. Experience has also shown that only a small or minimal amount of melting takes place and by regulating the mesh of the screen undesirable dispensing can be accomplished. Experience has also shown that the drum is stormproof, sweatproof, virtually unbendable, is non-corrodible, resists chemical destruction and even in cases where it is lost it still preserves the chemical insecticide for an extended period of time.

The aforementioned anti-licking stem 14 has been found to virtually prevent undesirable licking of the chemically coated screen. It follows that the drum shown and described well serves the purposes for which it has been devised, perfected and successfully used.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. An attracting, insecticide containing and insect exterminating drum of a type designed and adapted to be hung over and swingably suspended from but below the neck of a horse, cattle or farm animals likely to be pestered by flies, bugs and many and varied insects comprising: a receiver, open at its top and closed at its bottom by a rigid fine mesh insect feeding and air circulating screen, the upper wall portion of said receiver having circumferentially spaced vertical open-ended slits defining yieldable segmental wall portions, an open-ended box-like insecticide container integrally built into the receptacle portion of said receiver and seated atop and partially supported by said screen, an imperforate cover spanning and cooperatively covering the open top of said receiver and having a solid depending cylindrical rim-wall surrounding and telescopingly receiving a major portion of said receiver and provided with diametrically opposite keeper holes, the wall of said receiver having diametrically opposite outstanding keeper pins removably but retentively plugged into the respectively cooperable keeper holes, said screen being provided with a lick-resisting and animal protecting guard.

2. The insect exterminating drum defined in and according to claim 1, and wherein a top surface of said cover is provided with an integral upstanding lug-like hanger flange having paired rope accommodating holes, and a length of rope bent upon itself between its ends and adapted to be saddled over and hung from the neck of an animal, a cow, for example, said rope having lower free ends threaded adjustably and releasably through the holes provided therefor in said flange.

3. The insect exterminating drum defined in and according to claim 2, and wherein said drum is made from rigid moldable plastic material, said rope being made of nylon and being of a length to aptly suspend and dangle the drum for effectually serviceable use.

4. The insect exterminating drum defined in claim 2, and wherein said screen is centrally provided with a depending rigid stud constituting the aforementioned lick-resisting animal protecting guard.

5. The exterminating drum defined in claim 1, and wherein said receiver and also said cover are conformingly cylindrical in shape and are made of durably moldable plastic material.

6. An insect attracting, insecticide containing and insect exterminating and disposing drum expressly adapted to be swingably hung and suspended from, but below, the neck of farm animals, cows, for example, comprising: a cup-like receiver open at its top and provided across its bottom with a fine mesh air circulating, insecticide dispensing, and exterminating screen, said screen being integral with the bottom portion of said receiver, an open-ended box-type container built into and confined within the receptacle portion of said receiver and designed and adapted to hold and dispense the insecticide by way of said screen, an imperforate cover spanning and cooperatively covering the open top of the receiver and container, respectively, and telescopingly receiving a major portion of said receiver, means carried by adjacent and cooperating portions of and uniting said receiver with the encompassing wall portion of said cover, said screen being provided with a depending stud and said stud constituting a lick-resisting and animal protecting guard.

7. The insect exterminating drum defined in and according to claim 6, and wherein said cover has a top portion provided with a central integral upstanding hanger flange, said flange having paired and oriented rope-end accommodating holes, and a length of rope bent and looped upon itself between its ends, the looped portion being adapted to be saddled over and hung from the neck of the animal, said rope having lower free ends threaded adjustably and releasably through the holes provided therefor in said flange.

8. The insect exterminating drum defined in and according to claim 7, and wherein said receiver is cylindrical in shape and wherein said cover embodies a depending cylindrical rim wall surrounding and telescopingly receiving the major portion of said receiver and being provided with diametrically opposite keeper holes, the associated portions of the wall of said receiver having diametrically opposite outstanding keeper pins removably and retentively plugged into the keeper holes.

* * * * *